US005966984A

United States Patent [19]

Moore et al.

[11] Patent Number: 5,966,984

[45] Date of Patent: Oct. 19, 1999

[54] ENGAGEMENT ASSEMBLY FOR AN AUTOMOTIVE STARTER

[75] Inventors: Thomas S. Moore, Northville; William W. Doolittle, III, Ann Arbor, both of Mich.

[73] Assignee: Chrysler Corporation, Auburn Hills, Mich.

[21] Appl. No.: 08/892,714

[22] Filed: Jul. 15, 1997

Related U.S. Application Data

[63] Continuation of application No. 08/545,185, Oct. 20, 1995, abandoned.

[51] Int. Cl.[6] ............................ F02N 15/06; B60K 41/02

[52] U.S. Cl. ................................ 74/6; 74/7 C; 192/99 S; 477/167

[58] Field of Search .......................... 74/6, 7 C; 477/167, 477/181; 192/99 S

[56] References Cited

U.S. PATENT DOCUMENTS 1,044,366 11/1912 English .................................. 477/167
3,092,229 6/1963 Uher ...................................... 192/99 S
3,983,983 10/1976 Steiskal et al. ........................ 192/99 S
4,617,855 10/1986 Wrobleski et al. ..................... 477/167
5,165,293 11/1992 Kittaka et al. ........................ 74/7 C X

FOREIGN PATENT DOCUMENTS 56-138524 10/1981 Japan .................................... 477/167

*Primary Examiner*—Charles A. Marmor
*Assistant Examiner*—Troy Grabow

[57] ABSTRACT

A starting assembly for an automotive vehicle is connected to the clutch pedal thereof. The pivoting of the clutch pedal (in a clockwise direction in FIG. 1) pulls a clutch connector. The clutch connector pivots a clutch lever (in a counter-clockwise direction in FIG. 1) which, in turn, actuates a translator. The translator transforms and translates the pivoting movement of the clutch lever into a linear movement of a starter pinion gear to engage the starter ring gear. The hyper-pivoting of the clutch pedal forces the closure of a contact switch which provides power for an electric motor (not shown) to rotate the starter pinion gear and, therefore, start the internal combustion engine of the automotive vehicle.

15 Claims, 1 Drawing Sheet

ENGAGEMENT ASSEMBLY FOR AN AUTOMOTIVE STARTER

This application is a continuation of U.S. application Ser. No. 08/545,185, filed Oct. 20, 1995 now abandoned.

BACKGROUND OF THE INVENTION

1. Field of the Invention

The invention relates to a starter assembly for an automotive vehicle. More specifically, the invention relates to a starter assembly actuatable by a clutch pedal.

2. Description of Related Art

Current starting assemblies for automotive vehicles utilize the potential energy stored in a battery to operate an electric motor which turns the engine until the engine is running. Theses starting assemblies are started when a starter solenoid is actuated by the closing of a circuit by the ignition key. Additional electrical energy is expended when the pinion gear of a starting assembly is moved to engage a ring gear thereof. These electrical components increase the cost and weight of a vehicle, including the increased size and capacity of the electrical battery so that the battery has enough potential energy stored to operate the starter solenoid and the additional electric motor which is used to move the pinion gear.

SUMMARY OF THE INVENTION

Accordingly, an assembly for an automotive vehicle is disclosed. The automotive vehicle includes a starter pinion gear, a starter ring gear, an internal combustion engine and a clutch pedal. The starting assembly includes a clutch lever pivotal about a first point. A clutch connector is secured between the clutch lever and the clutch pedal such that the movement of the clutch pedal pivots the clutch lever about the first point. The starting assembly further includes a translator connected between the clutch lever and the starter pinion gear such that the movement of the clutch lever by the clutch pedal moves the starter pinion gear into alignment with the starter ring gear to start the internal combustion engine.

One advantage associated with the invention is the elimination of the starter solenoid and an electric motor to move the starter pinion gear. Another advantage associated with the invention is the reduction in battery size due to the elimination of the starter solenoid and the electric motor, both of which consume power from the battery.

BRIEF DESCRIPTION OF THE DRAWINGS

Other advantages of the present invention will be readily appreciated as the same becomes better understood by reference to the following detailed description when considered in connection with the accompanying drawing, wherein.

DETAILED DESCRIPTION OF THE PREFERRED EMBODIMENT(S)

Figure 1:
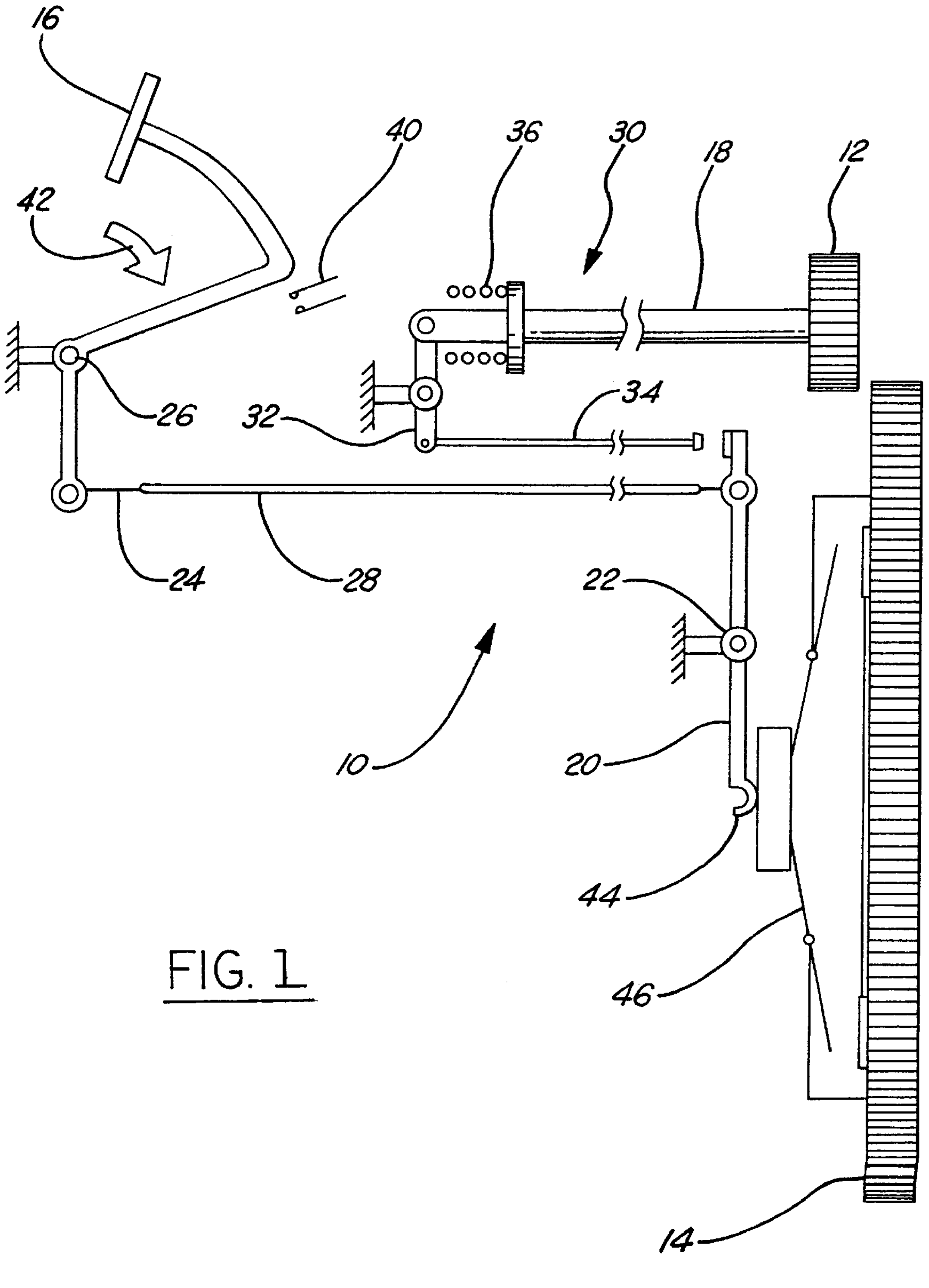
FIG. 1 is a schematic side view of one embodiment of the invention.

Referring to the Figure, a starting assembly for an automotive vehicle (not shown) is generally indicated at 10. The automotive vehicle includes a starter pinion gear 12, a starter ring gear 14, an internal combustion engine (not shown) and a clutch pedal 16. The clutch pedal 16 is pivoted or depressed when it is desired to change the gears of a manual transmission of the automotive vehicle. The starter pinion gear 12 engages the starter ring gear 14 by laterally moving into engagement therewith (to the right as shown in FIG. 1). The starter pinion gear 12 is held in position by a gear connector 18. The gear connector 18 includes a helical groove design (not shown) which allows the pinion gear 12 to turn the ring gear 14. Once the starter ring gear 14 is rotating faster than the pinion gear 12 due to the internal combustion engine, the starter pinion gear 12 is forced back down the gear connector 18 along the helical grooves and out of engagement with the starter ring gear 14. It is at this point that the starter pinion gear 12 is no longer needed because the internal combustion engine has been started.

The starter assembly 10 includes a clutch lever 20 which pivots about a first point 22. The clutch lever 20 is connected to the clutch pedal 16 through a clutch connector 24. The clutch connector 24 is secured between the clutch lever 20 and the clutch pedal 16 such that the movement of the clutch pedal 16 pivots the clutch lever 20 about the first point 22. More specifically, the pivoting of the clutch pedal 16 about a pivot point 26 pulls the clutch connector 24 which, in turn, pivots the clutch lever 20 about the first point 22. In one embodiment, the clutch connector 24 is a flexible cable which extends through a conduit 28 such that the flexible cable 24 may force the movement of the clutch lever 20 in fore and aft motions.

A translator, generally shown at 30, is connected between the clutch lever 20 and the starter pinion gear 12. The translator 30 translates and transforms the pivoting movement of the clutch lever 20 to linear movement of the starter pinion gear 12. A translator 30 moves the starter pinion gear 12 into alignment with the starter ring gear 14 to start the internal combustion engine.

In one embodiment, the translator 30 includes a starter lever 32. The starter lever 32 is removably connected to the clutch lever through a pivot rod 34. Further, the starter lever 32 is connected to the starter pinion gear 12 through the gear connector 18. A tension spring 36 biases the gear connector 18 and the starter pinion gear 12 away from the starter ring gear 14 to ensure the starter pinion gear 12 does not inadvertently align itself with the starter ring gear 14.

A remote electronic control 40 starts a starter motor (not shown) to turn the starter pinion gear 12. The remote electronic control 40 includes a physical contact for interacting with the clutch pedal 16. The remote electronic control is an electrical contact switchable between open and close conditions by movement of the clutch pedal 16. More specifically, the pivoting motion of the clutch pedal 16 in the direction of arrow 42 beyond a normal operating position (the normal operating position for switching the gears of the manual transmission) forces the closure of the electrical contacts 40 to close the circuit providing electrical power for a starting motor to turn the starter pinion gear 12.

The clutch lever 20 includes a clutch release end 44 which contacts a clutch spring 46. The clutch spring 46 biases the clutch release end 44 preventing the starter pinion gear 12 from engaging the starter ring gear 14 if the clutch pedal 16 is not released. The invention has been described in an illustrative manner, and it is to be understood that the terminology which has been used is intended to be in the nature of words of description rather than of limitation.

Modifications and variations of the present invention are possible in light of the above teachings. It is, therefore, to be understood that within the scope of the appended claims the invention may be practiced otherwise than as specifically described.

What is claimed is:

1. A starting assembly for an automotive vehicle having a starter pinion gear, a starter ring gear, an internal combustion engine and a clutch pedal, said starting assembly comprising:

a clutch lever pivotal about a first point;

a clutch connector secured between said clutch lever and the clutch pedal such that movement of the clutch pedal pivots said clutch lever about said first point;

a translator connected between said clutch lever and the starter pinion gear, said translator including a pivot rod movable by said clutch lever, a starter lever pivotally secured to said pivot rod to receive the movement thereof, and a gear connector pivotally secured to said starter lever and the starter pinion gear to move the starter pinion gear into engagement with the starter ring gear to start the internal combustion engine; and a remote electronic control contactable by the clutch pedal to start a starter motor to turn the starter pinion gear.

2. A starting assembly as set forth in claim 1 wherein said remote electronic control includes a physical contact for interacting with the clutch pedal.

3. A starting assembly as set forth in claim 2 wherein said remote electronic control is an electrical contact switchable between open and close conditions by movement of the clutch pedal.

4. A starting assembly as set forth in claim 1 wherein said clutch lever includes a clutch release end.

5. A starting assembly as set forth in claim 4 including a clutch spring biasing said clutch release end preventing the starter pinion gear from engaging the starter ring gear when the clutch pedal is released.

6. A starting assembly as set forth in claim 1 including a tension spring biasing said gear connector preventing the starter pinion gear from engaging the starter ring gear when the clutch pedal is released.

7. A staring assembly for an automotive vehicle having a starter pinion gear, a starter ring gear, and internal combustion engine and a clutch pedal, said starting assembly comprising:

a clutch lever pivotal about a first point;

a clutch connector secured between said clutch lever and the clutch pedal such that movement of the clutch pedal pivots said clutch lever about said first point; and a translator connected between said clutch lever and the starter pinion gear such that mechanical movement of said clutch lever by the clutch pedal mechanically moves the starter pinion gear into alignment with the starter ring gear to start the internal combustion engine.

8. A starting assembly as set forth in claim 7 wherein said translator includes a starter lever.

9. A starting assembly as set forth in claim 8 wherein said translator includes a gear connector connecting said starter lever to the starter pinion gear.

10. A starting assembly as set forth in claim 7 including remote electronic control to start a starter motor to turn the starter pinion gear.

11. A starting assembly as set forth in claim 10 wherein said remote electronic control includes a physical contact for interacting with the clutch pedal.

12. A starting assembly as set forth in claim 11 wherein said remote electronic control is an electrical contact switchable between open and closed conditions by movement of the clutch pedal.

13. A starting assembly as set forth in claim 7 wherein said clutch lever includes a clutch release end.

14. A starting assembly as set forth in claim 13 including a clutch spring biasing said clutch release end preventing the starter pinion gear from engaging the starter ring gear when the clutch pedal is released.

15. A starting assembly as set forth in claim 9 including a tension spring biasing said gear connector preventing the starter pinion gear from engaging the starter ring gear when the clutch pedal is released.

* * * * *